United States Patent
Wafer

[19]

[11] Patent Number: 6,007,111

[45] Date of Patent: *Dec. 28, 1999

[54] DUAL METAL SEAL FOR WELLHEAD HOUSING

[75] Inventor: Don B. Wafer, Spring, Tex.

[73] Assignee: FMC Corporation, Chicago, Ill.

[*] Notice: Under 35 U.S.C. 154(b), the term of this patent shall be extended for 253 days.

[21] Appl. No.: 08/539,926

[22] Filed: Oct. 6, 1995

[51] Int. Cl.$^6$ .............................. E21B 33/03; F16J 15/08
[52] U.S. Cl. ...................... 285/334.2; 285/351; 166/379; 277/593; 277/595
[58] Field of Search ................................ 285/341, 334.2, 285/351, 332.2; 166/379; 277/236, 167.5

[56] References Cited

U.S. PATENT DOCUMENTS

| 2,568,581 | 9/1951 | Crain | 285/341 |
|---|---|---|---|
| 3,325,190 | 6/1967 | Eckert et al. | 285/341 |
| 3,325,192 | 6/1967 | Sullivan | 285/341 |
| 3,501,158 | 3/1970 | Tillman, III | 277/167.5 |
| 3,749,426 | 7/1973 | Tillman, III | 285/335.2 |
| 4,390,186 | 6/1983 | McGee et al. | 277/236 |
| 4,563,025 | 1/1986 | Poe | 285/334.2 |
| 5,039,140 | 8/1991 | Szymczak | 285/334.2 |
| 5,103,915 | 4/1992 | Sweeney et al. | 166/379 |
| 5,135,266 | 8/1992 | Bridges et al. | 285/146 |
| 5,149,148 | 9/1992 | Taeuber, Jr. et al. | 285/341 |

FOREIGN PATENT DOCUMENTS

| 2158217 | 5/1973 | Germany | 285/334.2 |
|---|---|---|---|
| 1255777 | 9/1986 | U.S.S.R. | 277/167.5 |
| 2235741 | 3/1991 | United Kingdom | 285/334.2 |

Primary Examiner—Eric K. Nicholson
Attorney, Agent, or Firm—Henry C. Query, Jr.

[57] ABSTRACT

A system for sealing a wellhead, the system comprising: a wellhead housing for connecting to a well string casing, the wellhead housing being annularly disposed about a central axis comprising: a primary sealing surface disposed within the wellhead housing; a reference surface extending below the primary sealing surface; and a secondary sealing surface extending below the reference surface; a wellhead connector annularly disposed about the central axis having disposed therein a connector sealing surface; and a secondary seal ring annularly disposed about the central axis and comprising: a ring seal surface for sealing contact with the connector sealing surface; and an extension extending below the ring seal surface and having disposed thereon a sealing land extending from a lower portion of the extension for sealing contact with the wellhead housing. A system for sealing a wellhead, the system comprising: a wellhead housing annularly disposed about a central axis comprising: a primary sealing surface disposed within the wellhead housing; a secondary sealing surface extending below the primary sealing surface; and a lever point; and a wellhead connector annularly disposed about the central axis and having disposed therein a connector sealing surface; and a secondary seal ring annularly disposed about the central axis and comprising: a ring seal surface for sealing contact with the connector sealing surface; a sealing land for sealing contact with the wellhead housing; and a lever contact point for engagement with the lever point about which compressive forces imposed by the wellhead housing and the wellhead connector generate a moment which energizes the sealing land.

9 Claims, 5 Drawing Sheets

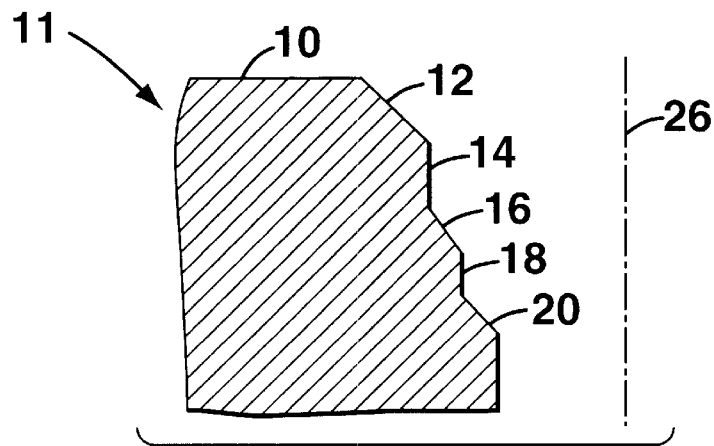
FIG_1
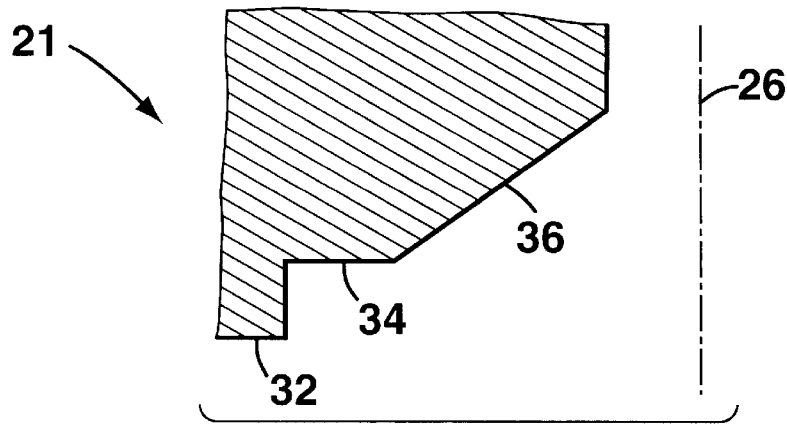
FIG_2
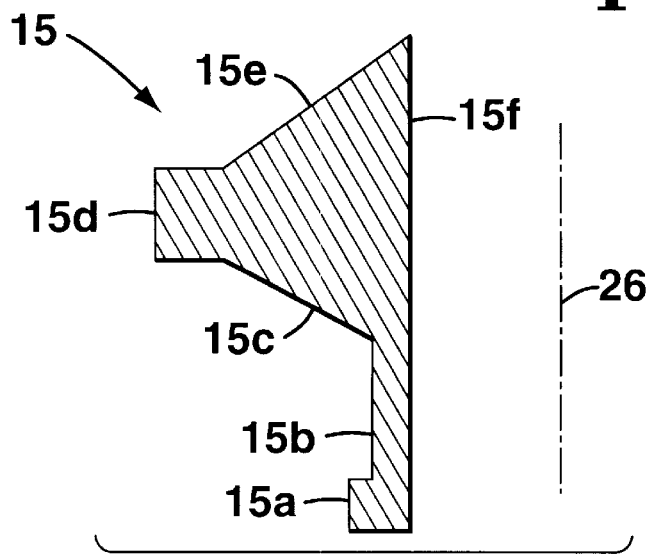
FIG_3

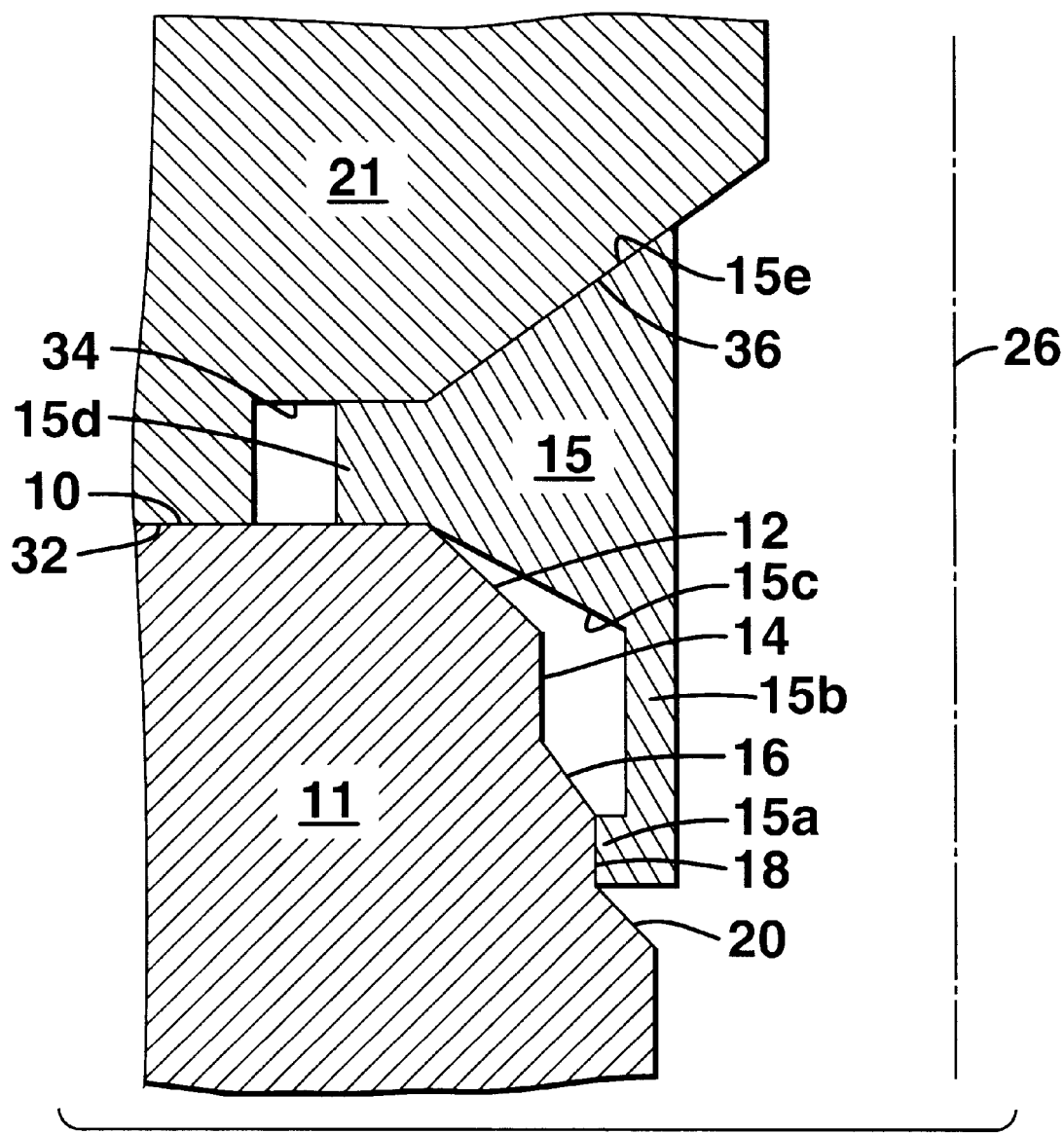
FIG_4

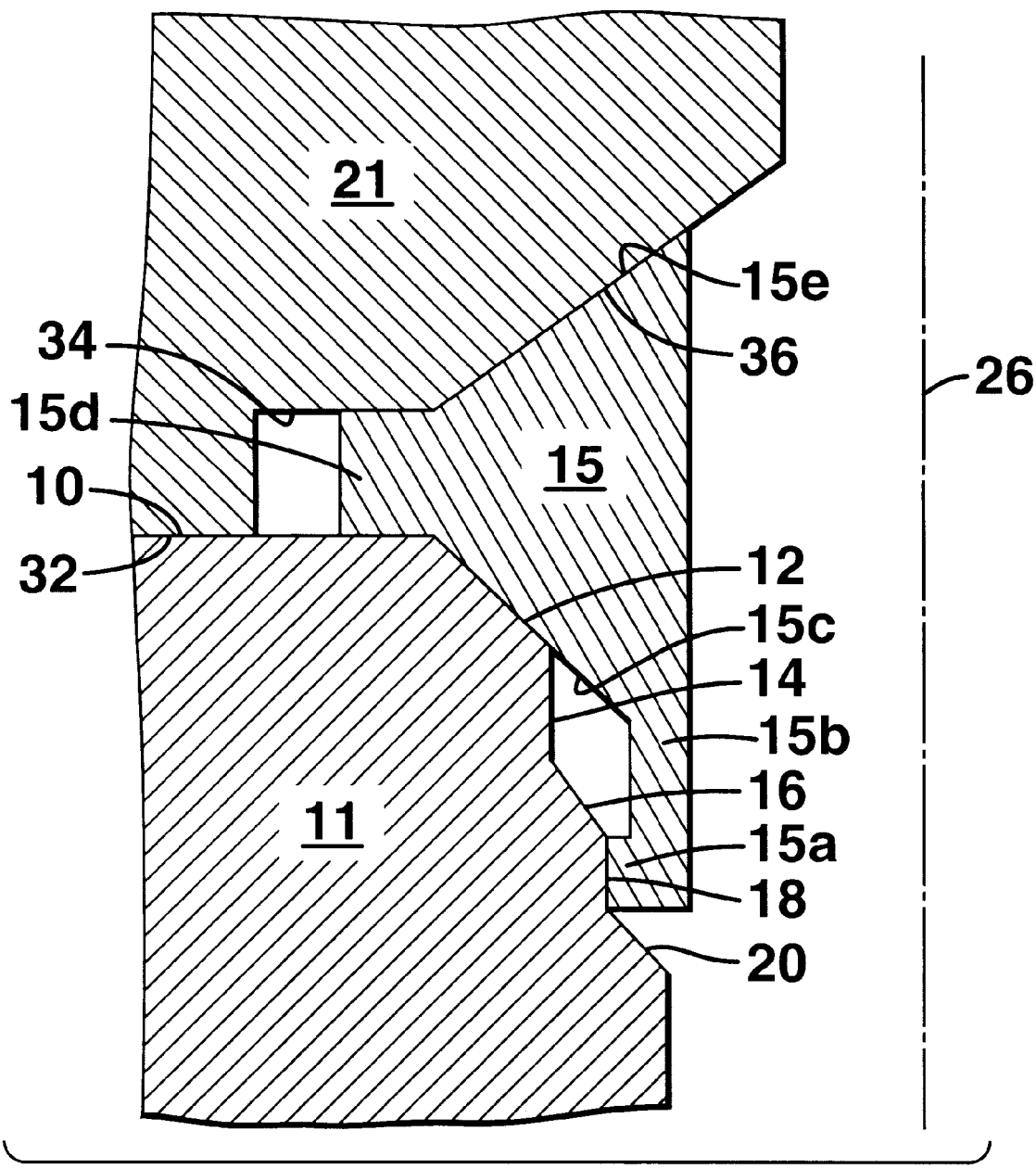
FIG_5

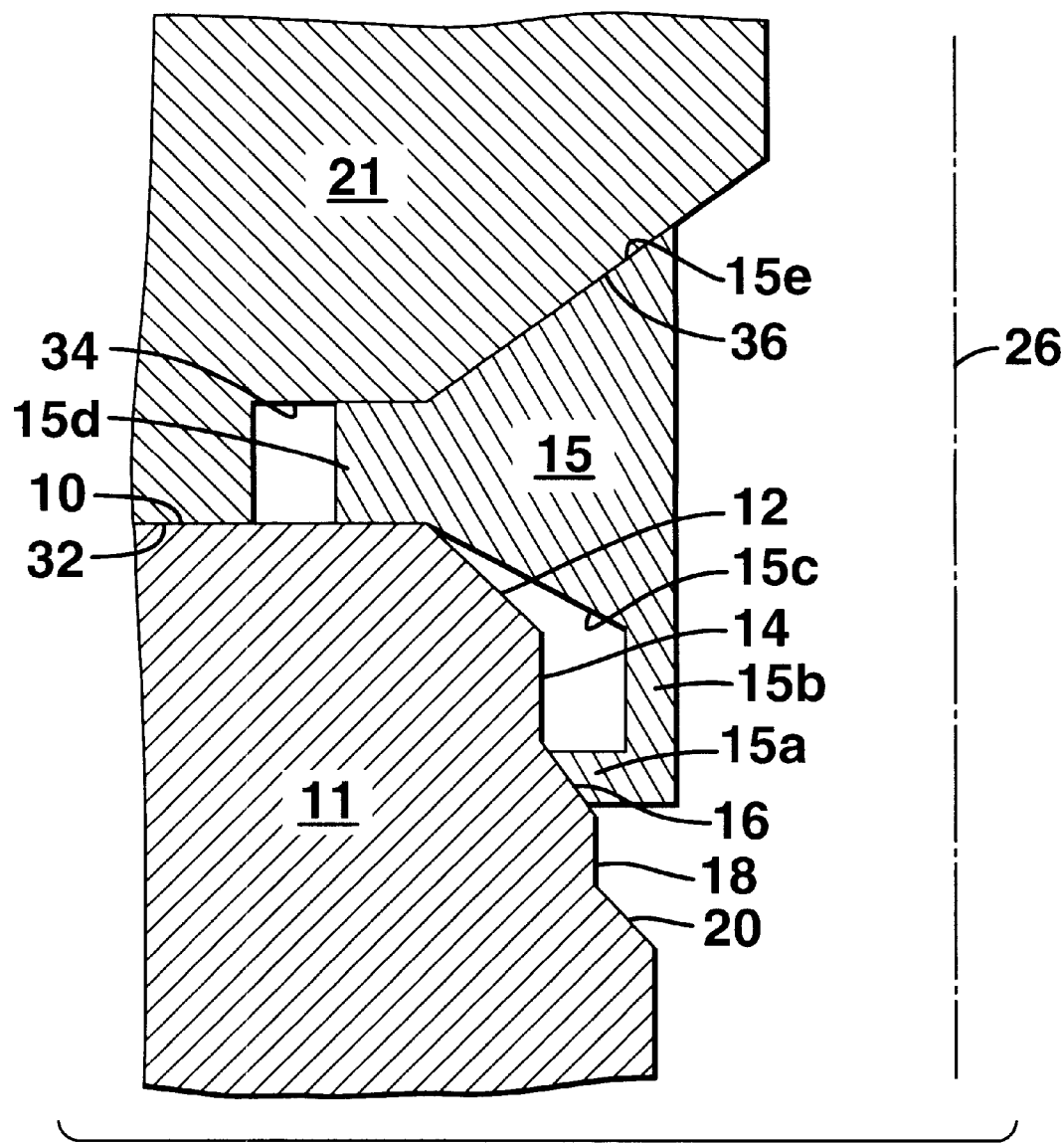
FIG_6

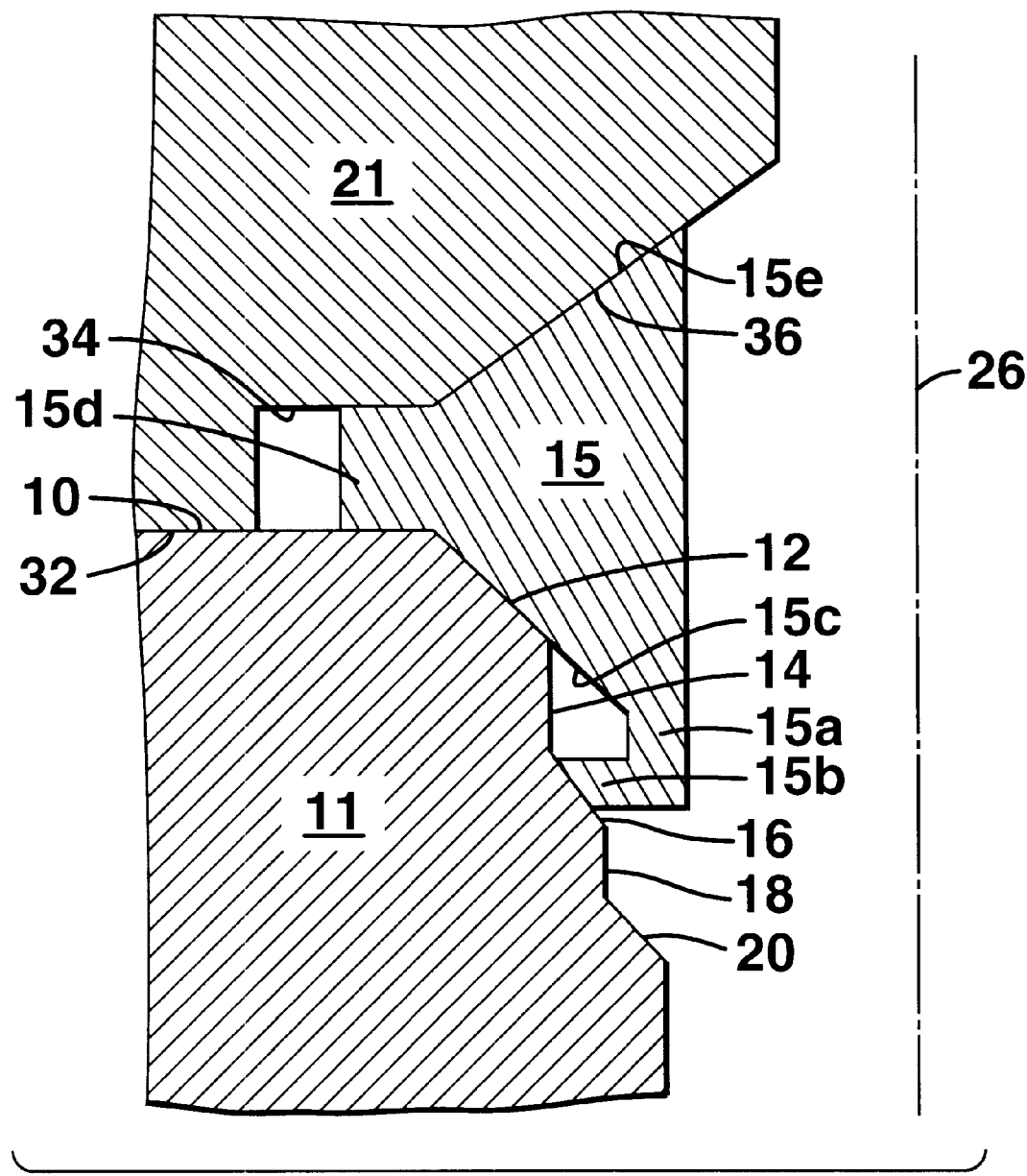
FIG_7

6,007,111

DUAL METAL SEAL FOR WELLHEAD HOUSING

FIELD OF THE INVENTION

This invention relates generally to wellhead housings and connectors, and in particular to seal assemblies that provide sealing even if the wellhead housing primary sealing surface becomes damaged.

BACKGROUND OF THE INVENTION

Metal-to-metal sealing surfaces have been proposed to seal junctions between tubular members such as: blowout preventers, production trees, side outlet valves and wellhead housings. Metal-to-metal seals must be precisely manufactured to enable a seal upon contact of the polished sealing surfaces.

Metal-to-metal seals will not effectively seal if one of the sealing surfaces becomes damaged. This is particularly problematic for inaccessible applications, such as subsea wellheads, where the seal surface cannot be easily removed to refinish the damaged seal surface. Thus, secondary sealing surfaces have been developed for use when a primary surface becomes damaged, for example, see U.S. Pat. No. 5,039,140 and U.S. Pat. No. 5,103,915, both of which are incorporated herein by reference.

However, such proposals are difficult to implement due to the difficulty in maintaining a tolerance in locating the secondary seal surface or in energization of the secondary seal. Further, no prior secondary seal for such an application has provided for a dual metal-to-metal seal, which is desirable for safety reasons. It is an object of the present invention to reduce or eliminate the above-mentioned problems.

SUMMARY OF THE INVENTION

According to one aspect of the invention, there is provided a system for sealing a wellhead. According to one embodiment, a system comprises: a wellhead housing for connecting to a well string casing, the wellhead housing being annularly disposed about a central axis comprising: a primary sealing surface disposed within the wellhead housing, a reference surface extending below the primary sealing surface, and a secondary sealing surface extending below the reference surface; a wellhead connector annularly disposed about the central axis having disposed therein a connector sealing surface; and a secondary seal ring annularly disposed about the central axis and comprising: a ring seal surface for sealing contact with the connector sealing surface and an extension extending below the connector sealing surface and having disposed thereon a sealing land extending from a lower portion of the extension for sealing contact with the wellhead housing.

According to a further embodiment of the invention, the system comprises: a wellhead housing annularly disposed about a central axis comprising: a primary sealing surface disposed within the wellhead housing, a secondary sealing surface extending below the primary sealing surface, and a lever point; a wellhead connector annularly disposed about the central axis and having disposed therein a connector sealing surface; and a secondary seal ring annularly disposed about the central axis and comprising: a ring seal surface for sealing contact with the connector sealing surface, a sealing land for sealing contact with the wellhead housing, and a lever contact point for engagement with the lever point about which compressive forces imposed by the wellhead housing and the wellhead connector generate a moment which energizes the sealing land.

According to still a further embodiment, the system comprises: a wellhead housing annularly disposed about a central axis comprising a primary sealing surface disposed within the wellhead housing and a secondary sealing surface extending below the primary sealing surface; a wellhead connector annularly disposed about the central axis and having disposed thereon a connector sealing surface; and a secondary seal ring annularly disposed about the central axis comprising: a ring seal surface for sealing contact with the connector sealing surface, a first seal surface for sealing contact with the conical primary sealing surface, and a second seal surface for sealing contact with the secondary seal surface.

According to a further aspect of the invention, a method for making a wellhead housing is provided, the method comprising: forming a wellhead housing; machining a reference surface; machining a primary sealing surface using the reference surface as a guide; machining a secondary sealing surface using the reference surface as a guide.

According to a further aspect of the invention, there is provided a wellhead housing produced by: forming a wellhead housing; machining a reference surface; machining a primary sealing surface using the reference surface as a guide; machining a secondary sealing surface using the reference surface as a guide.

BRIEF DESCRIPTION OF THE DRAWING

The present invention is better understood by reading the following description of nonlimitative embodiments with reference to the attached drawings, wherein like parts in each of the several figures are identified by the same reference character, which are briefly described as follows:

FIG. 1 is a cross-sectional view of a portion of a wellhead housing;

FIG. 2 is a cross-sectional view of a portion of a wellhead connector;

FIG. 3 is a cross-sectional view of a portion of a seal ring;

FIG. 4 is a cross-sectional view of a wellhead housing, a wellhead connector, and a secondary seal ring wherein they are assembled;

FIG. 5 is a cross-sectional view of a wellhead housing, a wellhead connector, and a secondary seal ring wherein they are assembled;

FIG. 6 is a cross-sectional view of a wellhead housing, a wellhead connector, and a secondary seal ring wherein they are assembled; and FIG. 7 is a cross-sectional view of a wellhead housing, a wellhead connector, and a secondary seal ring wherein they are assembled.

It is to be noted, however, that the appended drawings illustrate only typical embodiments of the invention and are therefore not to be considered a limitation of the scope of the invention which includes other equally effective embodiments.

DETAILED DESCRIPTION OF THE INVENTION

Referring to FIG. 1, a cross-section view of a portion of a wellhead housing (11) is depicted. The wellhead housing (11) is an annular structure having a central axis (26). There is an upward facing shoulder (10) at the top. A primary sealing surface (12) extends downward and inward from the upward facing shoulder (10), whereby it forms a conical surface. Below the primary sealing surface (12) there is a cylindrical reference surface (14) which is used during production of the wellhead housing as a reference for machining the sealing surfaces. Further below, there is a conical surface (16) that extends downward and radially inward from the cylindrical reference surface (14). Next, there is a cylindrical sealing surface (18) that extends downwardly from the conical surface (16). Finally, transition surface (20) connects cylindrical sealing surface (18) to the wellhead bore (defined by the wellhead bore central axis (26)).

The cylindrical reference surface (14) provides a reference point from which to machine both the primary sealing surface (12) and a secondary sealing surface. In separate embodiments, the secondary sealing surface is either conical (16) or cylindrical (18).

Referring to FIG. 2, there is shown a cross-sectional view of a portion of a wellhead connector (21). Like the wellhead housing (11), the wellhead connector (21) is an annular structure having a central axis (26). The wellhead connector (21) has a downward facing shoulder (32) for engagement with the upward facing shoulder (10) of the wellhead housing (11) (see FIG. 1). Also, there is a connector sealing surface (36) that extends upward and radially inward. A recess (34) is positioned between the downward facing shoulder (32) and the connector sealing surface (36).

Referring to FIG. 3, there is depicted a cross-sectional view of a portion of a secondary seal ring (15). The secondary seal ring (15) is also an annular structure having a central axis (26). It has a flange (15d) on its outer periphery that is insertable into the recess (34) of the wellhead connector (21) (see FIG. 2). A ring seal surface (15e) extends upward and radially inward from the flange (15d). A surface (15c) extends downward and radially inward from the flange (15d). Below the surface (15c) there is an extension (15b) that extends downward. At the end of the extension (15b) there is a sealing land (15a) that extends downward from the extension (15b). The interior surface (15f) of the secondary seal ring (15) faces the central axis (26).

Referring to FIG. 4, there is depicted a cross-sectional view of the wellhead housing (11), the wellhead connector (21), and the secondary seal ring (15) wherein they are assembled. In this embodiment of the invention, upward facing shoulder (10) and downward facing shoulder (32) abut against each other. The flange (15d) of the secondary seal ring (15) is inserted into the recess (34) of the wellhead connector (21). Connector sealing surface (36) forms a metal-to-metal seal with ring seal surface (15e) and sealing land (15a) forms a metal-to-metal seal with cylindrical sealing surface (18).

Also, in this embodiment, surface (15c) does not contact primary sealing surface (12). Extension (15b) is spaced near the reference surface (14) and conical surface (16) such that the extension (15b) does not contact any of these surfaces.

Referring to FIG. 5, there is shown a cross-sectional view of an embodiment of the present invention wherein the wellhead housing (11), the wellhead connector (21), and the secondary seal ring (15) are assembled. As before, upward facing shoulder (10) and downward facing shoulder (32) abut against each other. The flange (15d) of the secondary seal ring (15) is inserted into the recess (34) of the wellhead connector (21). The connector sealing surface (36) forms a metal-to-metal seal with ring seal surface (15e) and sealing land (15a) forms a metal-to-metal seal with cylindrical sealing surface (18).

However, in this embodiment, surface (15c) contacts primary sealing surface (12). If the primary sealing surface (12) has not become previously damaged, then an effective metal-to-metal seal may be obtained. Thus, there may be two metal-to-metal seals between the secondary seal ring (15) and the wellhead housing (11).

Referring to FIG. 6, there is depicted a cross-sectional view of the wellhead housing (11), the wellhead connector (21), and the secondary seal ring (15) wherein they are assembled. In this embodiment of the invention, upward facing shoulder (10) and downward facing shoulder (32) abut against each other. The flange (15d) of the secondary seal ring (15) is inserted into the recess (34) of the wellhead connector (21). Connector sealing surface (36) forms a metal-to-metal seal with ring seal surface (15e). In this embodiment, surface (15c) does not contact primary sealing surface (12). Also, conical surface (16) is machined and forms a metal-to-metal seal with the sealing land (15a).

Referring to FIG. 7, there is depicted a cross-sectional view of the wellhead housing (11), the wellhead connector (21), and the secondary seal ring (15) wherein they are assembled. In this embodiment of the invention, upward facing shoulder (10) and downward facing shoulder (32) abut against each other. The flange (15d) of the secondary seal ring (15) is inserted into the recess (34) of the wellhead connector (21). Connector sealing surface (36) forms a metal-to-metal seal with ring seal surface (15e) and sealing land (15a) forms a metal-to-metal seal with conical surface (16). In this embodiment, surface (15c) contacts conical primary sealing surface (12). If the primary sealing surface (12) has not become previously damaged, then an effective metal-to-metal seal may be obtained. Thus, there may be two metal-to-metal seals between the secondary seal ring (15) and the wellhead housing (11). However, even if a seal is not obtained, the contact still energizes the secondary seal surface.

Another aspect of the present invention is the generation of a moment in the secondary seal ring (15). The moment is generated by vertical forces exerted by the wellhead connector (21) and the wellhead housing (11). There is a downward vertical force component in the contact between the connector sealing surface (36) and the ring seal surface (15e). Similarly, there is an upward vertical force component in the contact between the upward facing shoulder (10) and the flange (15d) or between the primary sealing surface (12) and the surface (15c). Where the downward vertical force component is closer to the central axis (26) than the upward vertical force component, a moment is generated in the secondary seal ring (15). The moment is offset by a force in an inward radial direction relative to the central axis (26). This radial force is exerted by the wellhead housing wherever it is contacted by the sealing land (15a) and energizes the metal-to-metal seal between the sealing land (15a) and either the conical sealing surface (16) or the cylindrical sealing surface (18). The particular placement of the contact points between the wellhead connector (21), the wellhead housing (11) and the secondary seal ring (15) is not important so long as the sum of the forces exerted on the secondary seal ring (15) is sufficient to generate a moment. Thus, even if the conical primary sealing surface (12) has become damaged, it may still serve as a lever point to generate a moment in the secondary seal ring (15).

I claim:

1. A system for sealing a wellhead, the system comprising:

a wellhead housing annularly disposed about a central axis comprising:

a primary sealing surface disposed within said wellhead housing;

a reference surface extending below said primary sealing surface;

a secondary sealing surface extending below said reference surface; and a lever point; and a wellhead connector annularly disposed about the central axis and having disposed therein a connector sealing surface; and a seal ring annularly disposed about the central axis and comprising:

a ring seal surface for sealing contact with said connector sealing surface;

a sealing land for sealing contact with said secondary sealing surface of said wellhead housing; and a lever contact point for engagement with said lever point about which compressive forces imposed by said wellhead housing and said wellhead connector generate a moment which energizes said sealing land.

2. A system as in claim 1, wherein said secondary sealing surface of said wellhead housing is conical and said sealing land sealingly contacts said secondary sealing surface.

3. A system as in claim 1, wherein said secondary sealing surface of said wellhead housing is cylindrical and said sealing land sealingly contacts said secondary sealing surface.

4. A system as in claim 1, wherein said secondary seal ring further comprises a sealing surface for contact with said primary sealing surface of said wellhead housing.

5. A system as in claim 4, wherein said sealing surface sealingly contacts said primary sealing surface.

6. A system as in claim 1, further comprising a reference surface extending below said primary sealing surface.

7. A system as in claim 1, wherein a contact point between said ring seal surface and said connector sealing surface is positioned, relative to the central axis, closer than said lever contact point.

8. A system as in claim 1, wherein said sealing land energizes outwardly in a radial direction relative to said central axis.

9. A system as in claim 1, wherein said sealing land energizes in a vertical direction relative to said central axis.

* * * * *